No. 761,196. PATENTED MAY 31, 1904.
G. P. BOSWORTH.
STOP MOTION FOR SPOOLING MACHINES.
APPLICATION FILED AUG. 25, 1900.

NO MODEL. 2 SHEETS—SHEET 1.

WITNESSES:
Harry J. Garceau
Andrew J. Pitkin

INVENTOR:
George P. Bosworth
BY S. Scholfield
ATTY.

No. 761,196. PATENTED MAY 31, 1904.
G. P. BOSWORTH.
STOP MOTION FOR SPOOLING MACHINES.
APPLICATION FILED AUG. 25, 1900.

NO MODEL. 2 SHEETS—SHEET 2.

WITNESSES:
Harry J. Garreau
Andrew J. Pitcher

INVENTOR:
George P. Bosworth
BY S. Scholfield
ATTY.

No. 761,196. Patented May 31, 1904.

UNITED STATES PATENT OFFICE.

GEORGE P. BOSWORTH, OF PAWTUCKET, RHODE ISLAND, ASSIGNOR TO GEORGE W. PAYNE AND CO., OF PAWTUCKET, RHODE ISLAND, A FIRM.

STOP-MOTION FOR SPOOLING-MACHINES.

SPECIFICATION forming part of Letters Patent No. 761,196, dated May 31, 1904.

Application filed August 25, 1900. Serial No. 28,065. (No model.)

*To all whom it may concern:*

Be it known that I, GEORGE P. BOSWORTH, a citizen of the United States, residing at Pawtucket, in the State of Rhode Island, have invented a new and useful Improvement in Stop-Motions for Spooling-Machines, of which the following is a specification.

My invention consists in an improved combination of parts whereby upon the breaking or failure of one of the threads the fallen drop-wire will be automatically returned to its raised position, in which the eye of the drop-wire can be readily threaded for the continued operation of the spooler.

Figure 1:
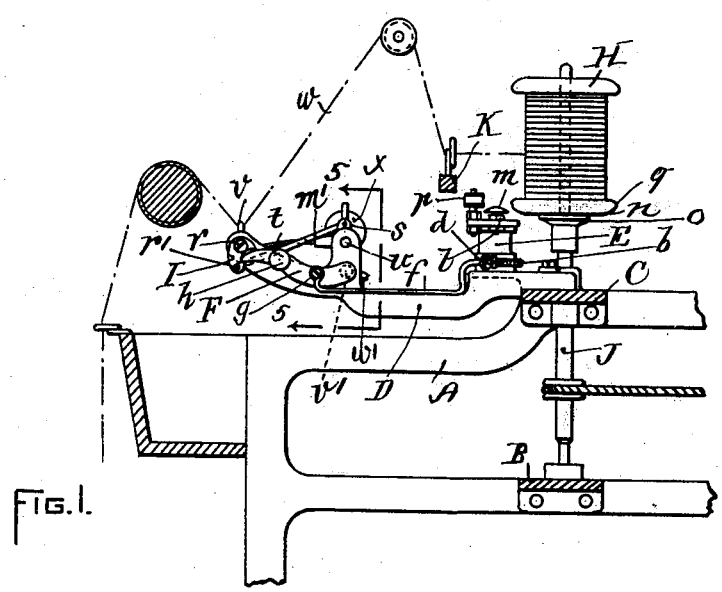
Figure 2:
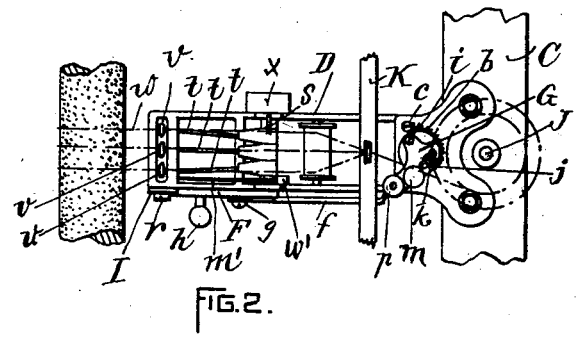
Figure 3:
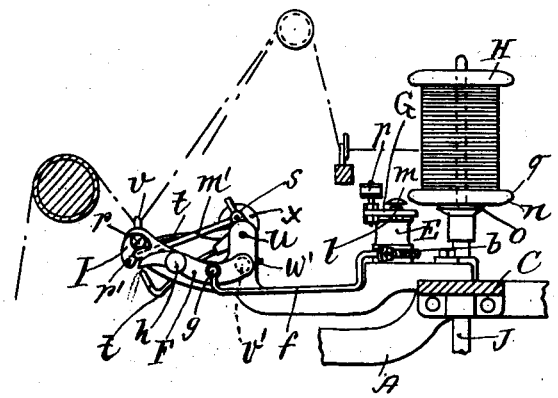
Figure 4:
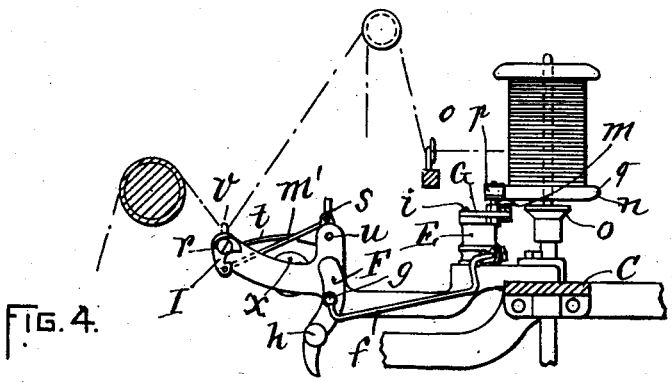
Figure 10:
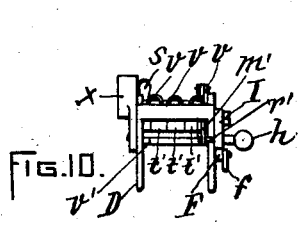
Figure 5:
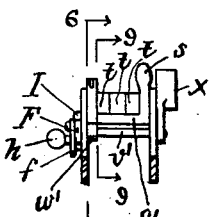
Figure 11:
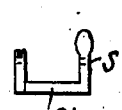
Figures 6, 7, 8:
Figure 9:
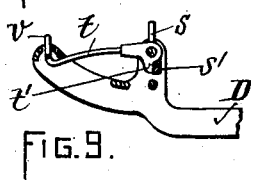

In the accompanying drawings, Figure 1 represents the side view of a stop-motion provided with my improvement. Fig. 2 represents the top view of the same. Fig. 3 represents the side view, as in Fig. 1, with one of the threads broken and its drop-wire fallen to its lower position. Fig. 4 represents the same side view with the eye of the drop-wire returned to its former position preparatory to threading. Fig. 5 represents a section taken in the line 5 5 of Fig. 1. Fig. 6 represents a section taken in the line 6 6 of Fig. 5 when the several parts of the mechanism are in the position shown in Fig. 1. Fig. 7 represents the same section when the several parts are in the position shown in Fig. 3. Fig. 8 represents the same section when the several parts are in the position shown in Fig. 4. Fig. 9 represents a section taken in the line 9 9 of Fig. 5 when the several parts are in the position shown in Fig. 1. Fig. 10 represents an end elevation. Fig. 11 represents a side view of the tripping-lever removed from the machine.

In the drawings, A represents the frame of the spooling-machine; B, the step-rail; C, the bolster-rail; J, the spindle, and K the traverse-bar.

To the bolster-rail C is attached the frame D, which supports the stop-motion mechanism, the said frame being provided with an upright stud, upon which is placed the loose sleeve E, which is operated to turn in one direction by means of the spiral spring $b$, the said spring being attached at one end to the post $c$, fixed in the frame D, and at the other end to the arm $d$, fixed in the side of the sleeve, the said arm $d$ being provided at its outer end with a perforation through which the connecting-rod $f$ loosely passes for limited sliding movement, the said connecting-rod being also jointed at $g$ to the gravitating catch-lever F, which is provided with the hand-operated knob $h$.

To the upper end of the sleeve E at the screw $i$ is pivoted the arm G, which is made capable of adjustment by means of the slot $j$ in the arm G and the tightening-screw $k$ in the sleeve, and the said arm G is provided with the screw-stud $l$, having a head $m$, which by contact with the rounded head $n$ of the spool H serves to raise the same from its supporting-disk $o$, as shown in Fig. 4. The outer end of the arm G is provided with the friction-head $p$, made of rubber or other suitable material, adapted by pressing against the edge $q$ of the head $n$ of the spool to check the momentum of the same upon the disengagement of the gravitating catch-lever F from the catch I. The catch I is loosely held upon the pivot-stud $r$ at the outer side of the frame D, and from the inwardly-projecting stud $r'$ of the catch I connection is made to the tripping-lever $s$ by means of the connecting-rod $m'$, the said tripping-lever $s$ and the drop-wires $t\ t\ t$ being pivoted upon the fixed rod $u$, which extends from side to side of the frame D. The catch-lever F is attached to the projecting outer end of the rock-shaft $v'$, and to the opposite end of the said shaft outside of the frame is secured the weighted arm $x$, the wiper-arm $w'$ being also attached to the said shaft within the frame. The several threads $w$ are made to pass through the eyes $v$ of the drop-wires $t$ and thence to the spool H, the said drop-wires when the several threads are intact being held in their elevated positions, as shown in Fig. 1, and upon the breaking or failure of one of the threads $w$ the downward projection $t'$ of the disengaged drop-wire $t$ by striking against the bar $s'$ of the tripping-lever $s$ will cause the disengagement of the gravitating catch-lever F from the catch I to cause the instantaneous stopping of the movement of the spool H without requiring the stopping of the spindle J, upon which the spool is supported, the said spool being first raised from the driving-disk $o$ by means of the swinging movement of the head $m$, caused by the resilience of the spring $b$, and then frictioned by the engagement of the friction-head $p$ with the edge $q$ of the head $n$ of the spool. When the friction-head $p$ has engaged with the edge of the head of the spool, the continued movement of the catch-lever F to the position shown in Fig. 4 will cause the movement of the connecting-rod $f$ loosely through the perforation in the outer end of the arm $d$ and will also cause the upward movement of the disengaged drop-wire $t$ by the resulting engagement of the wiper-arm $w'$ with the side of the tripping-lever $s$, thus causing the automatic return of the said drop-wire to its former position, in which the eye $v$ can be readily threaded, after which upon the upward movement of the catch-lever F by the hand of the operator the spool H will be released and allowed to drop to its seat upon the driving-disk $o$, and the said catch-lever will be brought into locking engagement with the catch I, as before, for the continued winding of the thread upon the spool.

I have preferably illustrated my improvement in connection with the stop-motion device for which I obtained Letters Patent of the United States, No. 575,663; but the improvement herein set forth for returning the drop-wire may be employed in connection with other devices for stopping the spool.

I claim as my invention—

In a stop-motion for spooling-machines, the combination of the rotating spindle, and means for stopping the rotation of the spool while the spindle continues its revolution, with the drop-wires, the tripping-lever, the catch operatively connected with the tripping-lever, the catch-lever retained in its elevated position by means of the catch, the operative connection between the catch-lever and the spool-stopping means, the wiper-arm, and operative connection between the catch-lever and the wiper-arm, whereby upon the tripping of the catch-lever the wiper-arm will serve to cause the return of the fallen drop-wire to its position for threading, substantially as described.

GEO. P. BOSWORTH.

Witnesses:
SOCRATES SCHOLFIELD,
ANDREW J. PITCHER.